United States Patent
Saeki

(10) Patent No.: US 7,002,893 B2
(45) Date of Patent: Feb. 21, 2006

(54) OPTICAL HEAD WITH PASSIVE TEMPERATURE COMPENSATION

(75) Inventor: Tetsuo Saeki, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/801,646

(22) Filed: Mar. 9, 2001

(65) Prior Publication Data

US 2001/0046200 A1    Nov. 29, 2001

(30) Foreign Application Priority Data

Mar. 9, 2000    (JP) ............................... 2000-065786

(51) Int. Cl.
  *G11B 7/135* (2006.01)
  *G11B 7/125* (2006.01)
(52) U.S. Cl. .............................. 369/112.19; 369/112.21
(58) Field of Classification Search .......... 369/112.19, 369/112.21, 120, 121
  See application file for complete search history.

(56) References Cited

U.S. PATENT DOCUMENTS 4,871,226 A * 10/1989 Courtney et al. ........ 350/96.17
6,243,350 B1 * 6/2001 Knight et al. ................ 369/126
6,449,221 B1 * 9/2002 Knight et al. ............ 369/13.35

FOREIGN PATENT DOCUMENTS

JP         9-312033 A      12/1997
JP         09312033 A    * 12/1997

* cited by examiner

*Primary Examiner*—Gautam R. Patel
(74) *Attorney, Agent, or Firm*—Birch, Stewart, Kolasch & Birch, LLP

(57) ABSTRACT

An optical pickup apparatus includes a light source and a light detector provided on a stem for detecting source emitted light reflected by an optical recording medium; and a light separating device, having first and second areas, for separating light incident thereon into a plurality of light components respectively directed in prescribed directions. The light detector includes a light receiver, divided into first and second light receiving regions for receiving the light components detected by those first and second areas. The first and second light receiving regions are located in a predetermined orientation determined in part by a light emitting point of the light source and a focal point on the light detector. The stem material and the wavelength emitted by the light source are selected to limit movement of that focal point in that orientation in response to temperature change of the apparatus.

8 Claims, 4 Drawing Sheets

Dashed line: extraordinary light
Solid line: ordinary light

⊘ : extraordinary light

○ : ordinary light

OPTICAL HEAD WITH PASSIVE TEMPERATURE COMPENSATION

BACKGROUND OF THE INVENTION

1. Field of the Invention

The present invention relates to an optical pickup apparatus usable in an optical disk drive.

2. Description of the Related Art

Japanese Laid-Open Publication No. 9-312033 discloses an integration type optical pickup apparatus 500 shown in FIG. 5.

The optical pickup apparatus 500 includes a semiconductor laser 101 as a light source for emitting laser light, a polarization beam splitter 102 for splitting the light emitted by the semiconductor laser 101, a mirror 103 for reflecting the light reflected by an optical disk (not shown) after being emitted by the semiconductor laser 101, a ¼ wave plate 104 for converting linearly polarized light from the semiconductor laser 101 into circularly polarized light, a light detector 106 for detecting the light reflected by the optical disk, and a diffraction device 105 including two areas for directing the light emitted by the semiconductor laser 101 and reflected by the optical disk toward the light detector 106.

FIG. 6 is a schematic plan view of the diffraction device 105. As shown in FIG. 6, the diffraction device 105 includes two areas G and H.

FIG. 7 is a schematic plan view of the light detector 106. As shown in FIG. 7, the light detector 106 includes a first light receiver 106a and a second light receiver 106b which are both provided on one stem 500b (FIG. 5) while being at a distance from one another. A light receiving plane of the first light receiver 106a is equally divided along two dividing lines into four quadrangular light receiving regions A, B, C and D. The first light receiver 106a is provided so that a line vertical to the plane thereof matches the optical axis of the light incident on the diffraction device 105, and so that the two dividing lines are respectively parallel and perpendicular to a tracking direction of the optical disk. A light receiving plane of the second light receiver 106b is equally divided into two light receiving regions E and F along a dividing line 106c.

The above-described elements of the optical pickup apparatus 500 are integrally structured. Returning to FIG. 5, the semiconductor laser 101 and the light detector 106 are accommodated in a housing 500a. On the housing 500a, the polarization beam splitter 102 and the mirror 103 are provided. The polarization beam splitter 102 is provided so that a center line thereof matches the optical axis of the semiconductor laser 101. The mirror 103 is provided parallel to the plans of polarization of the polarization beam splitter 102 and is oriented so that light reflected by the mirror 103 is vertically incident on the light detector 106. On a light outgoing surface of the polarization beam splitter 102, the ¼ wave plate 104 is provided so that an optic axis thereof inclines at 45 degrees with respect to the polarization direction of the light from the semiconductor laser 101. The diffraction device 105 is provided on a surface of the polarization beam splitter 102, the surface facing the mirror 103.

The optical pickup apparatus 500 operates as follows. Light emitted by the semiconductor laser 101 is transmitted through the polarization beam splitter 102. The light, which is linearly polarized, is converted into circularly polarized light by the ¼ wave plate 104 before leaving the optical pickup apparatus 500. Then, the light is transmitted through an optical system (not shown) including an objective lens and a collimator lens, and is focused onto the optical disk as a recording medium.

The light reflected by the optical disk is incident again on the optical pickup apparatus 500 through the ¼ wave plate 104. The light which has been transmitted through the ¼ wave plate 104 is linearly polarized in a direction which is perpendicular to the polarization direction of the linearly polarized light emitted by the semiconductor laser 101. The light is then reflected by the polarization beam splitter 102 and is incident on the diffraction device 105.

Of the light which is transmitted through the diffraction device 105, a light component which has not been diffracted (zero'th order diffracted light component) is reflected by the mirror 103 and reaches the first light receiver 106a (FIG. 7). Whereas, a light component diffracted by the area G or H of the diffraction device 105 (FIG. 6) (first order diffracted light component) is focused on the central dividing line 106c of the second light receiver 106b (FIG. 7). When the optical disk moves away from the optical pickup apparatus 500, the focal point of the first order diffracted light component moves toward the light receiving region E or F from the central dividing line 106c of the second light receiver 106b. When the optical disk moves closer to the optical pickup apparatus 500, the focal point of the first order diffracted light component moves in the opposite direction (i.e., toward the light receiving region F or E from the central dividing line 106c).

An RF signal as an information reproduction signal is detected from a sum of signals which are output from the light receiving regions A, B, C and D of the first light receiver 106a. A tracking error signal is detected from signals each indicating a sum of signals output from the light receiving regions located diagonally (A+C, B+D) using a phase contrast method. A focusing error signal is detected from a signal indicating a difference between signals output from the light receiving regions (E–F) using the Foucault method.

When the temperature of the optical pickup apparatus 500 (FIG. 5) changes, the oscillation wavelength of the light from the semiconductor laser 101 changes, which in turn changes a diffraction angle of the first order diffracted light component. Accordingly, the focal point is shifted in a direction substantially perpendicular to the central dividing line 106c (FIG. 7) of the second light receiver 106b. As a result, the focusing error signal is slightly offset. This offset is generally known to be suppressed by inclining the central dividing line 106c.

However, when the temperature of the optical pickup apparatus 500 (FIG. 5) changes, the stem 500b and the optical components included in the optical pickup apparatus 500 expand or contract. This may also offset the focusing error signal in the case where the light detector 106 is located in a certain manner with respect to the other components.

In the case of the optical pickup apparatus 500 described in Japanese Laid-Open Publication No. 9-312033, the semiconductor laser 101 and the light detector 106 are provided on the same stem (or base) 500b. The central dividing line 106c (FIG. 7) is substantially perpendicular to a phantom straight line connecting the light emitting point of the semiconductor laser 101 and the focal point of the light on the light detector 106. Since the distance between the semiconductor laser 101 and the light detector 106 changes due to expansion or contraction of the stem 500b when the temperature of the optical pickup apparatus 500 changes, the first order diffracted light component from the diffraction device 105 is shifted toward the light receiving region E or F from the central dividing line 106c of the second light receiver 106b. Thus, the focusing error signal is offset. Since the polarization beam splitter 102 also expands or contracts in accordance with the temperature change, the relative positions of the polarization beam splitter 102 and the mirror 103 change, which also offsets the focusing error signal.

The conventional optical pickup apparatus can suppress the offset of the focusing error signal generated by the change in the wavelength, by inclining the central dividing line for dividing the light detector into two. However, the focusing error signal is also offset by the expansion or contraction of the optical components and the stem. Accordingly, the conventional optical pickup apparatus has a problem in that it is difficult to accurately record and/or reproduce information when the temperature thereof is changed.

SUMMARY OF THE INVENTION

According to one aspect of the invention, an optical pickup apparatus includes a stem; a light source provided on the stem; a light detector provided on the stem for detecting light emitted by the light source which is reflected by an optical recording medium; and a light separating device, divided into at least a first area and a second area, for separating the light incident on each of the first area and the second area into a plurality of light components and directing each of the light components in a prescribed direction. The light detector includes a light receiver, divided into a first light receiving region and a second light receiving region, for receiving the light components directed by the first area of the light separating device. The first light receiving region and the second light receiving region are located so that a first direction is substantially perpendicular to a second direction, where the first direction is a direction of a phantom straight line connecting a light emitting point of the light source and a focal point on the light detector of the light transmitted through the light separating device, and the second direction is a direction of a dividing line for dividing the light receiver into the first light receiving region and the second light receiving region. A material of the stem and a wavelength of the light from the light source are selected so that a distance of movement of the focal point on the light detector in a direction perpendicular to the second direction is within a prescribed tolerance limit, the movement being caused by a change in the wavelength of the light emitted by the light source and expansion or contraction of the stem, which are both caused by a temperature change of the optical pickup apparatus.

According to another aspect of the invention, an optical pickup apparatus includes a stem; a light source provided on the stem; a light detector provided on the stem for detecting light emitted by the light source and then reflected by an optical recording medium; and a light separating device, divided into at least a first area and a second area, for separating the light incident on each of the first area and the second area into a plurality of light components and directing each of the light components in a prescribed direction. The light detector includes a light receiver, divided into a first light receiving region and a second light receiving region, for receiving the light components directed by the first area of the light separating device. The first light receiving region and the second light receiving region are located so that a second direction is inclined with respect to a direction perpendicular to a first direction, where the first direction is a direction of a phantom straight line connecting a light emitting point of the light source and a focal point on the light detector of the light transmitted through the light separating device, and the second direction is a direction of a dividing line for dividing the light receiver into the first light receiving region and the second light receiving region. The second direction is inclined so that when the focal point on the light detector moves while having a component of the direction perpendicular to the second direction because of a change in the wavelength of the light emitted by the light source and expansion or contraction of the stem, which are both caused by a temperature change of the optical pickup apparatus, a change in an amount of the light component incident on the first light receiving region and a change in an amount of the light component incident on the second light receiving region are each within a prescribed tolerable limit.

In one embodiment of the invention, the optical pickup apparatus further includes a beam splitter for separating a part of the light reflected by the optical recording medium and directing the separated part to the light detector, wherein a material of the stem, a material of the beam splitter, and a wavelength of the light from the light source are selected so that a distance of movement of the focal point on the light detector in a direction perpendicular to the second direction is within a prescribed tolerance limit, the movement being caused by a change in the wavelength of the light emitted by the light source and expansion or contraction of the stem, which are caused by a temperature change of the optical pickup apparatus.

In one embodiment of the invention, the optical pickup apparatus further includes a beam splitter for separating a part of the light reflected by the optical recording medium and directing the separated part to the light detector, wherein the second direction is inclined with respect to the direction perpendicular to the first direction so that when the focal point on the light detector moves while having a component of the direction perpendicular to the second direction because of a change in the wavelength of the light emitted by the light source and expansion or contraction of the stem and the beam splitter, which are caused by a temperature change of the optical pickup apparatus, a change in an amount of the light component incident on the first light receiving region and a change an amount of the light component incident on the second light receiving region are each within a prescribed tolerable limit.

In one embodiment of the invention, the light separating device is divided into at least the first area and the second area by a dividing line which is substantially perpendicular to a tracking direction of the optical recording medium.

In one embodiment of the invention, the light receiver is divided into at least the first light receiving region and the second light receiving region by the dividing line which is substantially parallel to a dividing line for dividing the light separating device into at least the first area and the second area.

The present invention is directed to an integration type optical pickup apparatus having a light source and a light detector provided on the same stem in the same package. A light receiving plane of the light detector is divided into at least two light receiving regions. The two light receiving regions are located so that a second direction is substantially perpendicular to a first direction. The first direction is a direction of a phantom straight line connecting a light emitting point of the light source and a focal point on the light detector (in an embodiment described below, this is the focal point at which the light transmitted through a diffraction device is incident on light receiving regions 6e through 6j in FIG. 3). The second direction is a direction of a dividing line for dividing the light detector into two. A conventional integration type optical pickup apparatus has the following problem due to such a structure. When the temperature of the optical pickup apparatus changes, the wavelength of the light emitted by the light source changes, and the components of the optical pickup apparatus expand or contract. Accordingly, when the focal point on the light detector moves in a direction perpendicular to the second direction, a change in the amount of light received by each of the two light receiving regions changes. As a result, signal offsets occur.

According to the present invention, the focus offset is canceled by, for example, selecting appropriate materials for the components in consideration of expansion and contraction thereof as well as selecting a light source for emitting light having an appropriate wavelength. In more detail, the selection of the wavelength and the materials is performed so that the sum of (i) the distance of movement of the focal point on the light detector in a direction perpendicular to the second direction caused by the change in the wavelength (in an embodiment described below, this is the distance of movement of the focus error signal beam), and (ii) the distance of movement of the focal point on the light detector in a direction perpendicular to the second direction caused by the expansion or contraction of the components, is within a tolerable limit. In this manner, the offsets can be satisfactorily suppressed.

Alternatively, the focus offset can be cancelled by inclining the second direction with respect to a direction perpendicular to the first direction so that a change in the amount of the light incident on each of the two light receiving regions when the focal point on the light detector moves in a direction perpendicular to the second direction is within a tolerable limit.

Thus, the invention described herein makes possible the advantages of providing an optical pickup apparatus for accurately recording and/or reproducing information even when the temperature thereof is changed.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings. In the description below, an optomagnetic recording medium is used as an example of a medium for reflecting light which is emitted by a light source. The present invention is not limited to this, and any type of optical recording medium is usable.

Figure 1:
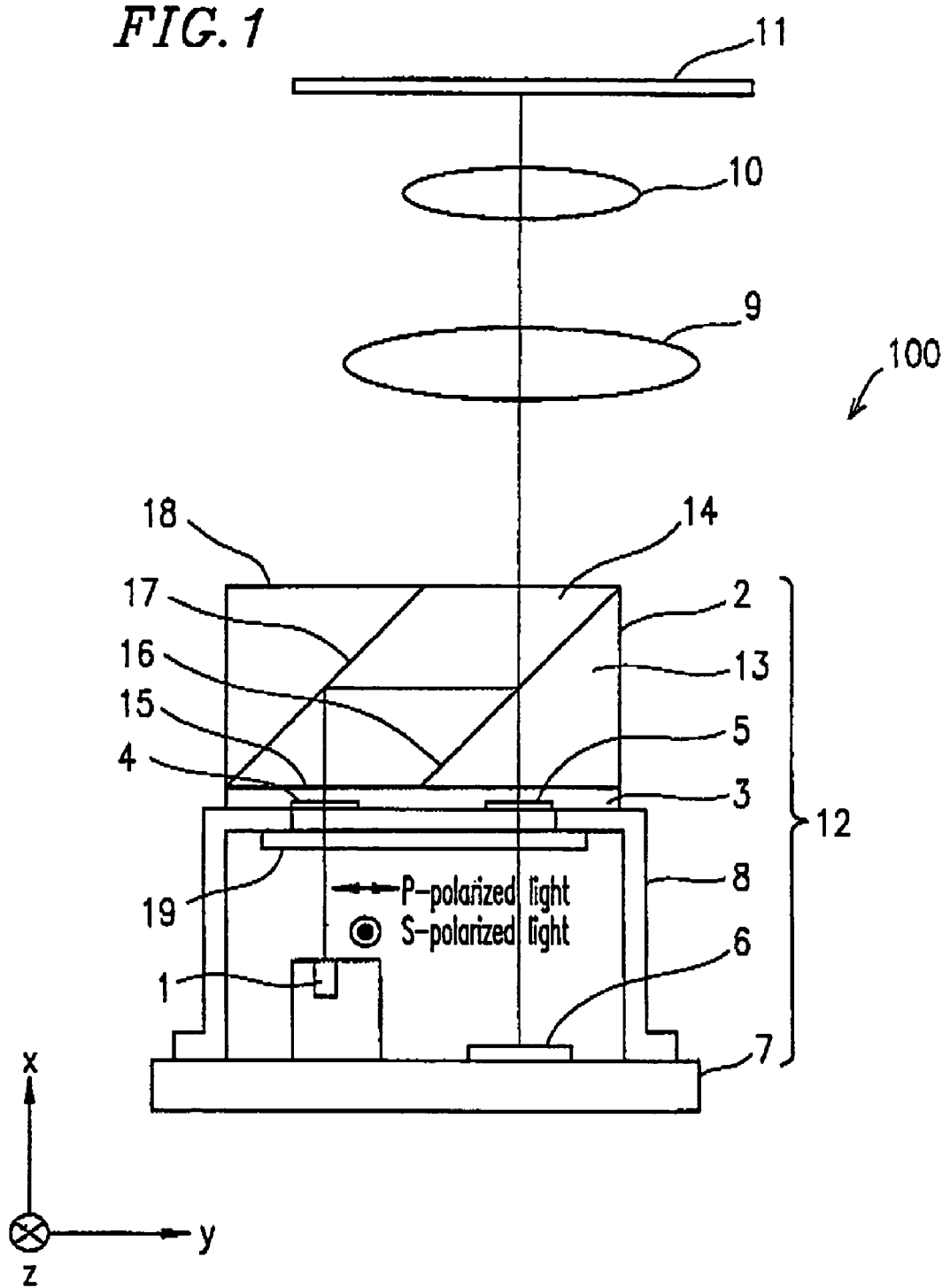
FIG. 1 is a schematic cross-sectional view illustrating a structure of an optical pickup apparatus according to one embodiment of the present invention.

FIG. 1 is a schematic cross-sectional view illustrating a structure of an optical pickup apparatus 100 according to one embodiment of the present invention. The optical pickup apparatus 100 includes a semiconductor laser 1 as a light source, and a light collection section for collecting light which is emitted by the semiconductor laser 1 to an optomagnetic recording medium 11. The light collection section includes a collimator lens 9 and an objective lens 10. On an optical path from the semiconductor laser 1 to the collimator lens 9, a beam splitter 2 is provided for separating a part of the light reflected by the optomagnetic recording medium 11 from the remaining part of the light. The semiconductor laser 1 is provided on a stem 7. A light detector 6 is provided on the same stem 7 for detecting light components which are separated by the beam splitter 2.

The beam splitter 2 includes a first member 14 formed of an optically isotropic material and a second member 13 formed of an optically anisotropic material. The beam splitter 2 has a first face 16 along which the first member 14 and the second member 13 contact each other, a second face 15 adjacent to the first face 16, a third face 17 opposed to the first face 16, and a fourth face 18 opposed to the second face 15. The light from the semiconductor laser 1 is only transmitted through the first member 14 and reaches the collimator lens 9. The light reflected by the optomagnetic recording medium 11 is transmitted through the first member 14 and then the second member 13, and reaches the light detector 6.

On an optical path from the beam splitter 2 to the light detector 6, a light-transmissive substrate 3 is provided. The light-transmissive substrate 3 has a first diffraction device 5 thereon for diffracting a part of the light reflected by the optomagnetic recording medium 11 to generate a control signal. The light-transmissive substrate 3 also has a second diffraction device 4 for separating the light from the semiconductor laser 1 into two beams for tracking (also referred to herein as the "tracking beams") and one beam for information reproduction (also referred to herein as the "information reproduction beam"). The second diffraction device 4 is provided on the same surface and at the same level as the first diffraction device 5, and on a path of the light emitted by the semiconductor laser 1. The second diffraction device 4 is a linear grating diffraction device having a constant pitch. The first diffraction device 5 is divided into at least two areas (not shown) by a dividing line which is substantially perpendicular to a tracking direction of the optomagnetic recording medium 11.

The stem 7 is covered with a cap 8. The light-transmissive substrate 3 and the beam splitter 2 are attached to the cap 8. A glass plate 19 is provided on a light transmission area of the cap 8 for air-tight sealing.

The optical pickup apparatus 100 operates as follows. S-polarized light emitted by the semiconductor laser 1 is incident on the second diffraction device 4 and is separated into two tracking beams and one information reproduction beam.

The light separated into three beams by the second diffraction device 4 is incident on the first member 14 of the beam splitter 2 through the second face 15. The light is reflected by the third face 17 and then by the first face 16 before leaving the optical pickup apparatus 100 through the fourth face 18. The light is then focused on the optomagnetic recording medium 11 by the collimator lens 9 and the objective lens 10. The first face 16 is set so as to have such polarizing characteristics that, for example, the reflectance of s-polarized light is 70% (transmittance: 30%) and the reflectance of p-polarized light is 0% (transmittance: 100%). Accordingly, 70% of the light emitted by the semiconductor laser 1 is directed to the optomagnetic recording medium 11.

The light reflected by the optomagnetic recording medium 11 has its plane of polarization rotated in accordance with the direction of magnetization recorded in the optomagnetic recording medium 11. The light is then transmitted through the objective lens 10 and the collimator lens 9, and is incident on the first member 14 of the beam splitter 2 through the fourth face 15. The light passes through the first face 16 and is incident on the second member 13. In the case where the first face 16 is set to have the above-described characteristics, only 30% of the s-polarized light and 100% of the p-polarized light pass through first face 16. Accordingly, the apparent rotation amount of the polarized light is increased.

The second member 13 is optically anisotropic. The light reflected by the optomagnetic recording medium 11 is split by the second member 13 into two polarized components which are perpendicular to each other. The two polarized components advance in different directions and are incident on the first diffraction device 5 to be partially diffracted. Since the light reflected by the optomagnetic recording medium 11 includes three beams, a total of six beams are incident on the first diffraction device 5 by the above-described polarization.

Figure 2:
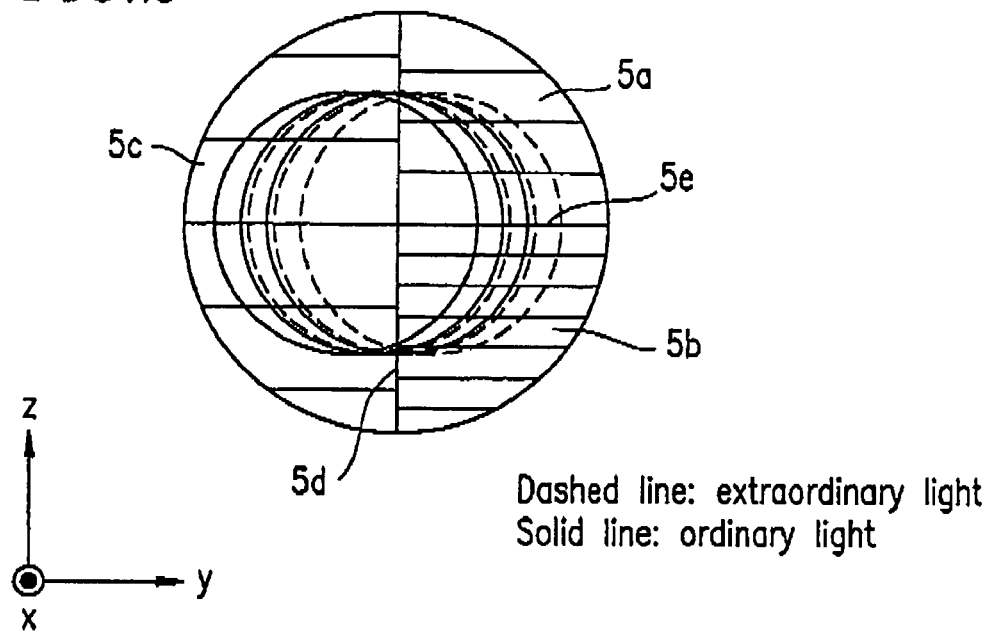
FIG. 2 is a schematic plan view of a first diffraction device in the optical pickup apparatus shown in FIG. 1.

FIG. 2 is a schematic plan view of the first diffraction device 5. The first diffraction device 5 has dividing lines 5d and 5e, which are respectively substantially perpendicular and substantially parallel to the tracking direction of the optomagnetic recording medium 11. The first diffraction device 5 is divided by the dividing lines 5d and 5a into three areas 5a, 5b and 5c. Among the two polarized components obtained by the second member 13 (FIG. 1), the ordinary light component is incident on the first diffraction device 5 as, for example, indicated with a solid line, and the diffraction device 5 as, for example, indicated with a dashed line. Since the three areas 5a, 5b and 5c have different grating pitches, the light components incident on the areas 5a, 5b and 5c are directed to different light receiving regions of the light detector 6.

Figure 3:
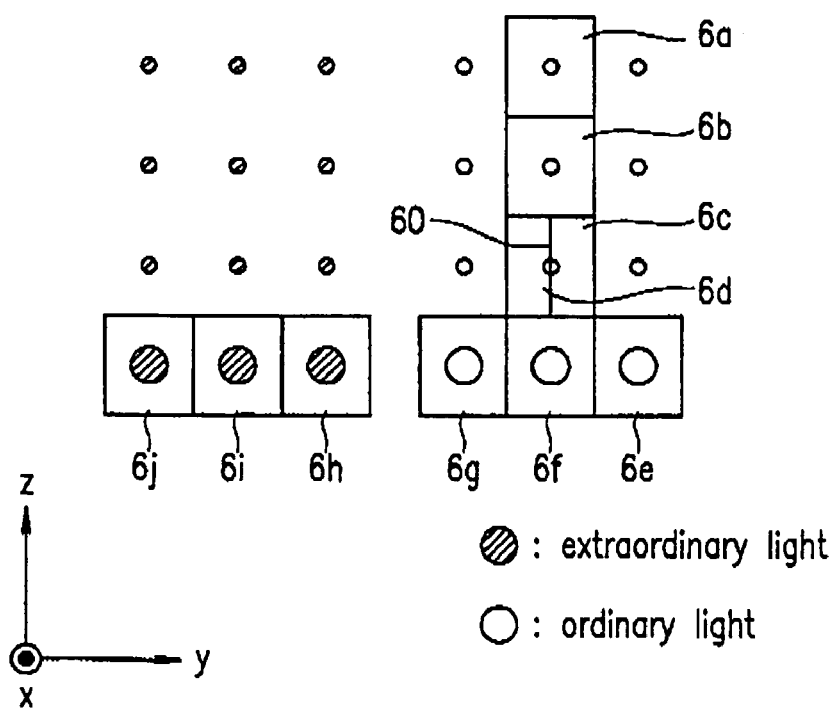
FIG. 3 is a schematic plan view of a light detector in the optical pickup apparatus shown in FIG. 1.
Figure 4:
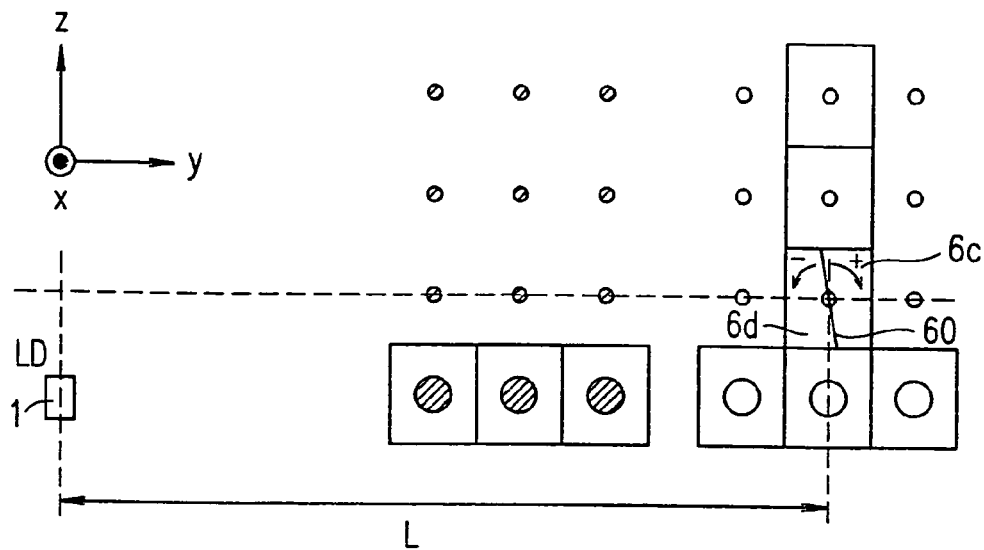
FIG. 4 is a plan view illustrating the positional relationship between a semiconductor laser and the light detector in the optical pickup apparatus shown in FIG. 1.

FIG. 3 is a schematic plan view of the light detector 6, and FIG. 4 is a plan view illustrating the positional relationship between the semiconductor laser 1 and the light detector 6. As shown in FIG. 3, a light receiving plane of the light detector 6 has, for example, light receiving regions 6a, 6b, 6c, 6d, 6e, 6f, 6g, 6h, 6i and 6j. The light receiving regions 6c and 6d are formed by a dividing line 60.

Herein, a direction of a phantom line connecting the light emitting point of the semiconductor laser 1 (FIG. 1) and the focal point of the light transmitted through the beam splitter 2 on the light detector 6 (i.e., y direction in FIG. 3) will be referred to as a "first direction", and a direction in which the dividing line 60 extends (i.e., the z direction in FIG. 3) will be referred to as a "second direction".

The dividing line 60 (second direction) between the light receiving regions 6c and 6d is substantially perpendicular to the tracking direction and also substantially perpendicular to the first direction. In other words, the light receiving regions 6a and 6d are separated from each other by the dividing line 60 which is substantially parallel to the dividing line 5d (FIG. 2) which divides the first diffraction device 5 into at least two areas. The extraordinary light components are incident on the light receiving regions 6h, 6i and 6j indicated with hatched circles in FIG. 3, and the ordinary light components are incident on the light receiving regions 6a through 6g indicated with white circles.

The information reproduction beam diffracted by the area 5a of the first diffraction device 5 is incident on the light receiving region 6a of the light detector 6 and is detected. The information reproduction beam diffracted by the area 5b is incident on the light receiving region 6b and is detected. The information reproduction beam diffracted by the area 5c is incident on the dividing line 60 between the light receiving regions 6c and 6d and is detected. The information reproduction beam transmitted through the first diffraction device 5 as the zero th diffracted light component is incident on the light receiving regions 6f and 6i and is detected. The two tracking beams transmitted through the first diffraction device 5 as the zero'th diffracted light components are incident on the light receiving regions 6a, 6g, 6h and 6j and are detected.

According to such a system, a focusing error signal can be obtained by calculating a difference between an output signal from the light receiving region 6c and an output signal from the light receiving region 6d by a knife edge method. A radial error signal can be obtained by calculating a difference between (i) a sum of output signals from the light receiving regions 6e and 6g and (ii) a sum of output signals from the light receiving regions 6h and 6j by a three beam method. A so-called push-pull signal is obtained by calculating a difference between an output signal from the light receiving region 6a and an output signal from the light receiving region 6b. The push-pull signal can be used to detect an address signal stored in the track of the optomagnetic recording medium 11 in a meandering pattern. An optomagnetic signal is obtained by calculating a difference between an output signal from the light receiving region 6f and the light receiving region 6i.

When the light emitted by the semiconductor laser 1 is focused on the optomagnetic recording medium 11, the information reproduction beam diffracted by the area 5c (hereinafter, referred to as the "focusing error signal beam") is focused to a point on the dividing line 60 between the light receiving regions 6c and 6d. Hereinafter, the movement of the focusing error signal beam when the temperature of the optical pickup apparatus 100 is $T=T_o \pm \Delta T$ will be described. In the following description, $T_o$ is the temperature when the focusing error signal beam is focused on the dividing line 60, $\lambda_o$ is the oscillation wavelength of the light emitted by the semiconductor laser 1 at the temperature $T_o$, $l_o$ is the distance L between the light emitting point of the semiconductor laser 1 and the dividing line 60 (FIG. 4), and $m_o$ is the distance M between the first face 16 (FIG. 1) and the third face 17 of the beam splitter 2. The "y direction" includes both to the +y direction and −y direction; and likewise, the "z direction" includes both the +z direction and the −z direction.

Herein, the temperature of the optical pickup apparatus means the temperature of a specific portion of the optical pickup apparatus. The temperature is preferably measured at, for example, the stem. Alternatively, the temperature may be of an arbitrary portion of the optical pickup apparatus so long as the entire optical pickup apparatus can be assumed to have a uniform temperature.

(1) When the temperature of the optical pickup apparatus 100 is $T=T_o+\Delta T$:

(a) When the temperature of the optical pickup apparatus 100 is $T=T_o+\Delta T$ and the oscillation wavelength of the light from the semiconductor laser 1 is $\lambda=\lambda_o+\Delta\lambda$, the diffraction angle of light at the first diffraction device 5 increases. Referring to FIG. 3, the focusing error signal beam is shifted in the +z direction and is defocused. The light spot is apparently shifted in the +y direction. In the case where the light is also diffracted in the y direction by the first diffraction device 5, the shift in the y direction is also caused by the change in the diffraction angle. Where $\Delta\lambda=20$ nm, for example, the light spot is shifted in the +y direction by about 0.13 $\mu$m.

(b) When the temperature of the optical pickup apparatus 100 is $T=T_o+\Delta T$, the stem 7 (FIG. 1) having the semiconductor laser 1 and the light detector 6 thereon expands in the y direction with respect to the light detector 6. Thus, $L=l_o+\Delta l$. As a result, the light emitting point of the semiconductor laser 1 is shifted in the −y direction by $\Delta l$, and therefore the focusing error signal beam is shifted toward the light receiving region 6d by $\Delta l$.

(c) When the temperature of the optical pickup apparatus 100 is $T=T_0+\Delta T$, the first member 14 of the beam splitter 2 also expands. Thus, $M=m_o+\Delta M$. As a result, the focusing error signal beam is shifted toward the light receiving region 6c by $\Delta M$.

(2) When the temperature of the optical pickup apparatus 100 is $T=T_o-\Delta T$:

(a) When the temperature of the optical pickup apparatus 100 is $T=T_o-\Delta T$ and the oscillation wavelength of the semiconductor laser 1 is $\lambda=\lambda_o-\Delta\lambda$, the diffraction angle of light at the first diffraction device 5 decreases. Referring to FIG. 3, the focusing error signal beam is shifted in the −z direction and is defocused. The light spot is apparently shifted in the −y direction. In the case where the light is also diffracted in the y direction by the first diffraction device 5, the shift in the y direction is also caused by the change in the diffraction angle. Where $\Delta\lambda=20$ nam, for example, the light spot is shifted in the −y direction by about 0.13 $\mu$m.

(b) When the temperature of the optical pickup apparatus 100 is $T=T_o-\Delta T$, the stem 7 (FIG. 1) having the semiconductor laser 1 and the light detector 6 thereon contracts in the y direction with respect to the light detector 6. Thus, $L=l_o-\Delta l$. As a result, the light emitting point of the semiconductor laser 1 is shifted in the +y direction by $\Delta l$, and therefore the focusing error signal beam is shifted toward the light receiving region 6c by $\Delta l$.

(c) When the temperature of the optical pickup apparatus 100 is $T=T_o-\Delta T$, the first member 14 of the beam splitter 2 also contracts. Thus, $M=m_o-\Delta M$. As a result, the focusing error signal beam is shifted toward the light receiving region 6d by $\Delta M$.

In either case (1) or (2), focus offsets (a) through (c) occur. This adversely influences a focus servo signal. According to the present invention, the total focus offset is canceled by, for example, selecting a semiconductor laser 1 for emitting light having an appropriate wavelength and selecting appropriate materials for the stem 7 and an optical component, such as the beam splitter 2, in consideration of expansion and contraction thereof. (Herein, the "total focus offset" of (a) through (c) is obtained in consideration of the focus offsets (a) through (c).)

Alternatively, the total focus offset can also be cancelled by inclining the dividing line 60 between the light receiving regions 6c and 6d.

It is not necessary to completely cancel the total focus offset. Further canceling is not necessary as long as, for example, the distance of movement of the focal point on the light detector 6 in a direction perpendicular to the second direction, caused by (a) the change in the wavelength of the light emitted by the semi conductor laser 1 as the light source, (b) the expansion or contraction of the steam 7, and (c) the expansion or contraction of the beam splitter 2, which are caused by the temperature change in the optical pickup apparatus 100, is within a prescribed tolerance limit.

In the case where the problem of the total focus offset is solved by inclining the dividing line 60, the dividing line 60 is inclined so that a change in the amount of light incident on each of the light receiving regions 6c and 6d is within a prescribed tolerance limit. The tolerance limit of the total focus offset depends on the type of optical recording medium. In the case of an optomagnetic recording medium, for example, the tolerance limit of the total focus offset is $\pm 0.4$ $\mu$m.

In the case where the degree of expansion or contraction of the beam splitter 2 is negligible, the focus offset (a) can be ignored. In this case, the wavelength of the light emitted by the semiconductor laser 1 as the light source and the material of the stem 7 can be selected so that the distance of movement of the focal point on the light detector 6 in a direction perpendicular to the second direction is within a prescribed tolerance limit.

Alternatively, the total focus offset as the sum of the offsets (a) and (b) can be reduced to be within a prescribed tolerance limit by inclining the dividing line 60 with respect to a direction perpendicular to the first direction, so that a change in the amount of light incident on each of the light receiving regions 6c and 6d is within a prescribed tolerance limit.

The beam splitter 2 (FIG. 1) may be eliminated from the optical pickup apparatus 100. In this case, the semiconductor laser 1, the first diffraction device 5, and the light detector 6 can be located so that the light emitted by the semiconductor laser 1 and reflected by the optomagnetic recording medium 11 reaches the light detector 6 through the first diffraction device 5.

In this embodiment, a semiconductor laser emitting light having an appropriate wavelength is selected, and appropriate materials for the stem 7 and the first member 14 of the beam splitter 2 are selected in consideration of expansion and contraction thereof. Expansion or contraction of the other components does not substantially influence the distance of movement of the light spot in a direction perpendicular to the second directions. The materials of the stem 7 and the first member 14 of the beam splitter 2 are selected in consideration of the expansion and contraction in the y direction. The expansion or contraction in the x direction or z direction does not need to be considered since the expansion or contraction in such directions does not influence the focus offset.

The change in the wavelength of the light emitted by the semiconductor laser, and the expansion or contraction of the optical components and the stem, which are caused by the temperature change, are substantially linear. Therefore, even $\Delta T$ is different, the materials for the stem 7 and the beam splitter 2 or the inclining angle of the dividing line 60 does not need to be changed. Since the optical pickup apparatus 100 is set so that the focus offset is zero when there is no temperature change, no problem occurs even when the temperature does not change.

In the above-described embodiment, a diffraction device is used as one example of a light separating device for separating the light reflected by the optomagnetic recording medium into a plurality of light components and directing each of the light components in a prescribed direction. Instead of the diffraction device, any device which has such a function is usable. Light is detected by the light receiving regions on the light receiving plane of the light detector.

Instead, the light can be detected by any device which has such a function. A semiconductor laser is used as one example of the light source. Instead, any device which has such a function is usable.

Hereinafter, specific examples of the present invention will be described.

EXAMPLE 1

An optical pickup apparatus having the structure shown in FIG. 1 is produced using the following. As the semiconductor laser 1, a semiconductor laser LTT22MC (oscillation wavelength: 780 nm, Sharp Kabushiki Kaisha) is used. As the material of the first member 14 of the beam splitter 2, LF5 (optical material, n=1.5722, coefficient of linear expansion: $9.1 \times 10^{-6}/°$ C., produced by SCHOTT) is used. As the material of the second member 13 of the beam splitter 2, $Li_2B_4O_7$ (birefringence material, $n_e$=1.548, $n_o$=1.604) is used. As the material of the stem 7, tin-containing copper (coefficient of linear expansion: $17.0 \times 10^{-6}/°$ C.) is used.

The optical pickup apparatus thus produced has the following settings.

The distance L between the light emitting point of the semiconductor laser 1 and the dividing line 60 (FIG. 3) between the light receiving regions 6c and 6d is 1.615 mm. The distance between the light emitting point of the semiconductor laser 1 and the light-transmissive substrate 3 is 1.731 mm. The distance M between the first face 16 and the third face 17 of the beam splitter 2 is 1.5 mm. The thickness of the light-transmissive substrate 3 is 0.4 mm. The thickness of the beam splitter 2 is 1.4 mm. The distance between the light-transmissive substrate 3 and the light detector 6 is 2.71 mm.

When the temperature of the optical pickup apparatus rises by 35° C. from room temperature, the oscillation wavelength of the light from the semiconductor laser 1 is increased by about 8.2 nm from 780 nm. At this point, the diffraction angle of light at the first diffraction device 5 changes, and thus the light spot of the focusing error signal beam moves by 1.580 μm in the +z direction and 0.060 μm in the +y direction. A focus offset caused by the movement obtained by simulation is −0.070 μm.

When the temperature of the optical pickup apparatus rises by 35° C. from room temperature, the stem 7 expands by 0.893 μm. A focus offset caused by such an expansion obtained by simulation is +0.615 μm.

When the temperature of the optical pickup apparatus rises by 35° C. from room temperature, the first member 14 of the beam splitter 2 expands by 0.478 μm. A focus offset caused by such an expansion obtained by simulation is −0.325 μm.

The above-mentioned change in the wavelength and expansion of the components occur at the same time due to the temperature change. The total focus offset obtained by simulation is +0.208 μm. An inclining angle of the dividing line 60 (FIG. 4) is set so that the output from the light receiving region 6c and the output from the light receiving region 6d are equal to each other at an arbitrary point while the temperature rises by 35° C.

In this example, the total focus offset can be reduced to 0.1 μm or less, which is the tolerable limit, by inclining the dividing line 60 by −0.157 degrees from the direction perpendicular to the y direction.

EXAMPLE 2

An optical pickup apparatus having the structure shown in FIG. 1 is produced using the following. As the semiconductor laser 1, a semiconductor laser LTT22MC (oscillation wavelength: 780 nm, Sharp Kabushiki Kaisha) is used. As the material of the first member 14 of the beam splitter 2, LF5 (optical material, n=1.5722, coefficient of linear expansion: $9.1 \times 10^{-6}/°$ C., produced by SCHOTT) is used. As the material of the second member 13 of the beam splitter 2, $Li_2B_4O_7$ (birefringence material, $n_e$=1.548, $n_o$=1.604) is used. As the material of the stem 7, soft iron (coefficient of linear expansion: $13.6 \times 10^{-6}/°$ C.) is used.

When the temperature of the optical pickup apparatus rises by 35° C. from room temperature, the oscillation wavelength of the light from the semiconductor laser 1 is increased by about 8.2 nm from 780 nm. At this point, the diffraction angle of light at the first diffraction device 5 changes, and thus the light spot of the focusing error signal beam moves by 1.580 μm in the +z direction and 0.060 μm in the +y direction. A focus offset caused by the movement obtained by simulation is −0.070 μm.

When the temperature of the optical pickup apparatus rises by 35° C. from room temperature, the stem 7 expands by 0.714 μm. A focus offset caused by such an expansion obtained by simulation is +0.500 μm.

When the temperature of the optical pickup apparatus rises by 35° C. from room temperature, the first member 14 of the beam splitter a expands by 0.478 μm. A focus offset caused by such an expansion obtained by simulation is −0.325 μm.

The above-mentioned change in the wavelength and expansion of the components occur at the same time due to the temperature change. The total focus offset obtained by simulation is +0.088 μm. Thus, the total focus offset can be reduced to 0.1 μm or less by using the above-described materials for the beam splitter 2 and the stem 7 together with the semiconductor laser 1 emitting light having the above-described oscillation wavelength.

Figure 5:
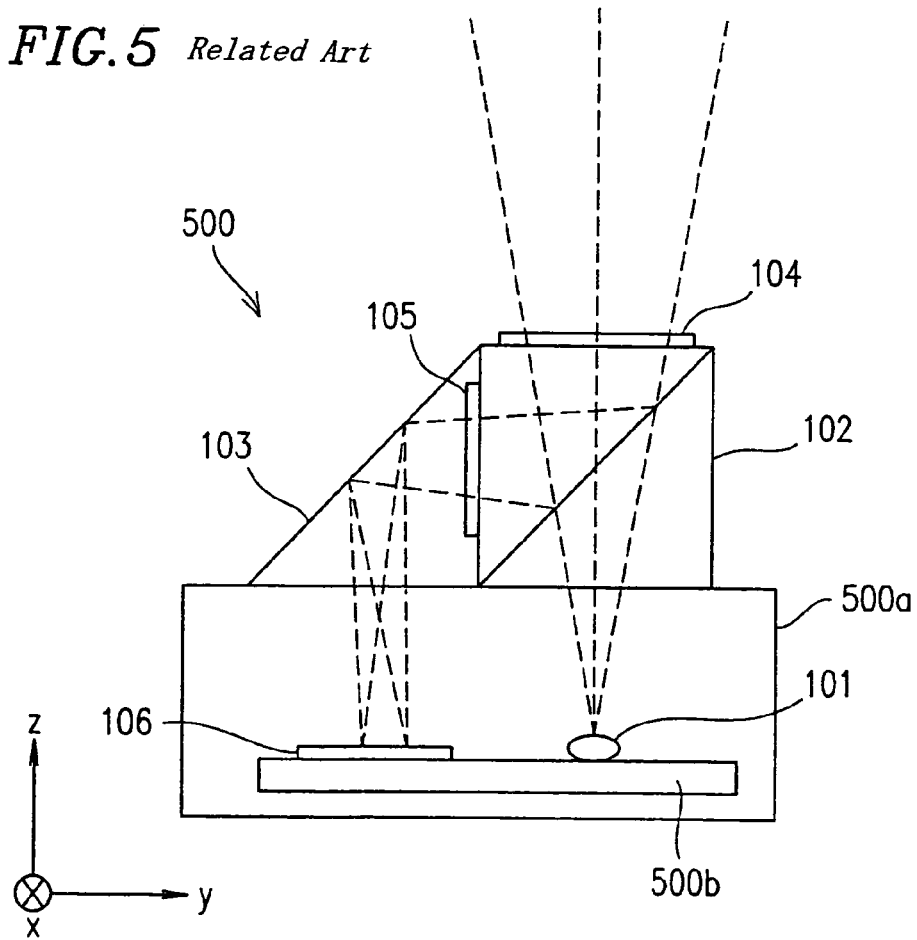
FIG. 5 is a schematic cross-sectional view illustrating a structure of a conventional optical pickup apparatus.
Figure 6:
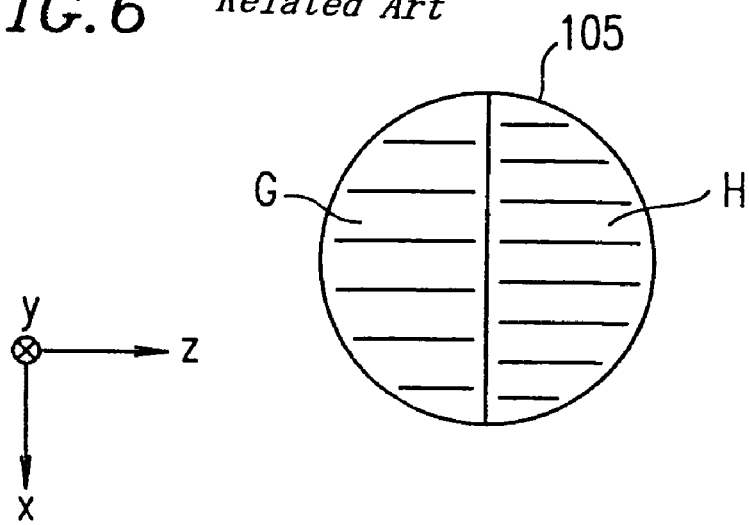
FIG. 6 is a schematic plan view of a first diffraction device in the conventional optical pickup apparatus shown in FIG. 5.
Figure 7:
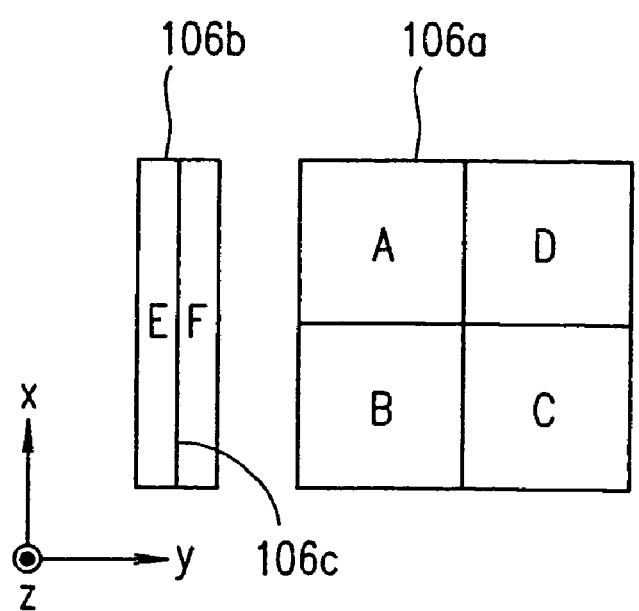
FIG. 7 is a schematic plan view of a light detector in the conventional optical pickup apparatus shown in FIG. 5.

The present invention is applicable to any optical pickup apparatus in which a light source and a light detector are provided on the same stem, and a dividing line for dividing a light receiving plane of the light detector into two is substantially perpendicular to a first direction. The present invention is applicable to, for example, an optical pickup apparatus having the structure shown in FIG. 5.

As described above, according to the present invention, the focus offset is canceled by, for example, selecting appropriate materials for the components in consideration of expansion and contraction thereof as well as selecting a light source for emitting light having an appropriate wavelength. In more detail, the selection is performed so that a change in the amount of the light incident on each of the two light receiving regions of the light detector is within a tolerable limit even when a temperature change of the optical pickup apparatus causes a change in the wavelength of the light emitted by the light source, or causes expansion or contraction of the components such as the stem or the beam splitter.

Such an adjustment of the change in the amount of the light incident on each of the two light receiving regions of the light detector can be achieved by appropriately inclining the dividing line for dividing the light detector.

Accordingly, even when the temperature of the optical pickup apparatus changes, an accurate focusing error signal is obtained and thus a satisfactory information reproduction signal is obtained. Therefore, the reliability of the optical pickup apparatus can be improved.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical pickup apparatus, comprising:
   a base;
   a light source provided on the base;
   a light detector provided on the base for detecting light emitted by the light source which is reflected by an optical recording medium; and
   a light separating device, divided into at least a first area and a second area, for separating the light incident on each of the first area and the second area into a plurality of light components and directing each of the light components in a prescribed direction,
   wherein
      the light detector includes a light receiver, divided into a first light receiving region and a second light receiving region, for receiving the light components directed by the first area of the light separating device,
      the first light receiving region and the second light receiving region are located so that a first direction is substantially perpendicular to a second direction, where the first direction is a direction of a phantom straight line connecting a light emitting point of the light source and a focal point on the light detector of the light transmitted through the light separating device, and the second direction is a direction of a dividing line for dividing the light receiver into the first light receiving region and the second light receiving region,
      a material of the base and a wavelength of the light from the light source are selected so that a distance of movement of the focal point on the light detector in a direction perpendicular to the second direction is within a prescribed tolerance limit, the movement being caused by a change in the wavelength of the light emitted by the light source and expansion or contraction of the base, which are both caused by a temperature change of the optical pickup apparatus,
      the light separating device being divided into at least the first area and the second area, wherein the areas have different grating pitches, by a dividing line which is substantially perpendicular to a tracking direction of the optical recording medium, and the light incident on the areas being directed to different light receiving regions of the light detector.

2. The optical pickup apparatus according to claim 1, further comprising a beam splitter for separating a part of the light reflected by the optical recording medium and directing the separated part to the light detector, wherein a material of the base, a material of the beam splitter, and a wavelength of the light from the light source are selected so that a distance of movement of the focal point on the light detector in a direction perpendicular to the second direction is within a prescribed tolerance limit, the movement being caused by a change in the wavelength of the light emitted by the light source and expansion or contraction of the base, which are caused by a temperature change of the optical pickup apparatus.

3. The optical pickup apparatus according to claim 1, wherein the light separating device is divided into at least the first area and the second area by a dividing line which is substantially perpendicular to a tracking direction of the optical recording medium.

4. The optical pickup apparatus according to claim 1, wherein the light receiver is divided into at least the first light receiving region and the second light receiving region by the dividing line which is substantially parallel to a dividing line for dividing the light separating device into at least the first area and the second area.

5. An optical pickup apparatus, comprising:
   a base;
   a light source provided on the base;
   a light detector provided on the base for detecting light emitted by the light source and then reflected by an optical recording medium; and
   a light separating device, divided into at least a first area and a second area, for separating the light incident on each of the first area and the second area into a plurality of light components and directing each of the light components in a prescribed direction,
   wherein
      the light detector includes a light receiver, divided into a first light receiving region and a second light receiving region, for receiving the light components directed by the first area of the light separating device,
      the first light receiving region and the second light receiving region are located so that a second direction is inclined with respect to a direction perpendicular to a first direction, where the first direction is a direction of a phantom straight line connecting a light emitting point of the light source and a focal point on the light detector of the light transmitted through the light separating device, and the second direction is a direction of a dividing line for dividing the light receiver into the first light receiving region and the second light receiving region,
      the second direction is inclined so that when the focal point on the light detector moves while having a component of the direction perpendicular to the second direction because of a change in the wavelength of the light emitted by the light source and expansion or contraction of the base, which are both caused by a temperature change of the optical pickup apparatus, a change in an amount of the light component incident on the first light receiving region and a change in an amount of the light component incident on the second light receiving region are each within a prescribed tolerable limit,
      the light separating device being divided into at least the first area and the second area, wherein the areas have different grating pitches, by a dividing line which is substantially perpendicular to a tracking direction of the optical recording medium, and the light incident on the areas being directed to different light receiving regions of the light detector.

6. The optical pickup apparatus according to claim 5, further comprising a beam splitter for separating a part of the light reflected by the optical recording medium and directing the separated part to the light detector, wherein the second direction is inclined with respect to the direction perpendicular to the first direction so that when the focal point on the light detector moves while having a component of the direction perpendicular to the second direction because of a change in the wavelength of the light emitted by the light source and expansion or contraction of the base and the beam splitter, which are caused by a temperature change of the optical pickup apparatus, a change in an amount of the light component incident on the first light receiving region and a change an amount of the light component incident on the second light receiving region are each within a prescribed tolerable limit.

7. The optical pickup apparatus according to claim 5, wherein the light separating device is divided into at least the first area and the second area by a dividing line which is substantially perpendicular to a tracking direction of the optical recording medium.

8. The optical pickup apparatus according to claim 5, wherein the light receiver is divided into at least the first light receiving region and the second light receiving region by the dividing line which is substantially parallel to a dividing line for dividing the light separating device into at least the first area and the second area.

* * * * *